United States Patent
Gou et al.

(10) Patent No.: US 11,619,843 B2
(45) Date of Patent: Apr. 4, 2023

(54) DISPLAY DEVICE

(71) Applicant: Japan Display Inc., Tokyo (JP)

(72) Inventors: Zhengyi Gou, Tokyo (JP); Hisanori Kawakami, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 17/651,297

(22) Filed: Feb. 16, 2022

(65) Prior Publication Data

US 2022/0171222 A1    Jun. 2, 2022

Related U.S. Application Data

(63) Continuation of application No. PCT/JP2020/022073, filed on Jun. 4, 2020.

(30) Foreign Application Priority Data

Aug. 23, 2019    (JP) .............................. JP2019-152740

(51) Int. Cl.
   *G02F 1/13357*    (2006.01)
   *G02F 1/1334*    (2006.01)
   *F21V 8/00*    (2006.01)

(52) U.S. Cl.
   CPC ......... *G02F 1/1334* (2013.01); *G02B 6/0073* (2013.01); *G02F 1/133615* (2013.01)

(58) Field of Classification Search
   CPC .................... G02F 1/133615; G02B 6/0073
   USPC ......................................................... 349/49
   See application file for complete search history.

(56) References Cited

U.S. PATENT DOCUMENTS

| 2008/0284946 | A1 | 11/2008 | Abe et al. |
| 2010/0085510 | A1 | 4/2010 | Okuyama et al. |
| 2013/0002982 | A1* | 1/2013 | Momose ............... G02B 6/0075 362/613 |
| 2016/0070047 | A1 | 3/2016 | Okuyama et al. |
| 2017/0352329 | A1 | 12/2017 | Imai |

FOREIGN PATENT DOCUMENTS

| JP | 2008-287892 A | 11/2008 |
| JP | 2010-092682 A | 4/2010 |
| JP | 2016-057338 A | 4/2016 |
| JP | 2017-215510 A | 12/2017 |

OTHER PUBLICATIONS

International Search Report dated Aug. 4, 2020 in PCT/JP2020/022073 filed on Jun. 4, 2020, 2 pages.

* cited by examiner

*Primary Examiner* — Christopher M Raabe
(74) *Attorney, Agent, or Firm* — Maier & Maier, PLLC

(57) ABSTRACT

According to one embodiment, a display device includes a display panel and a light-emitting module. The light-emitting module includes a first light source having a first light-emitting point, a second light source having a second light-emitting point, a first light guide and a second light guide forming a contact portion in contact with the first light guide. The first light guide and the second light guide are arranged in a first direction, and a distance between the contact portion and the first light-emitting point along the first direction is equal to a distance between the contact portion and the second light-emitting point along the first direction.

17 Claims, 16 Drawing Sheets

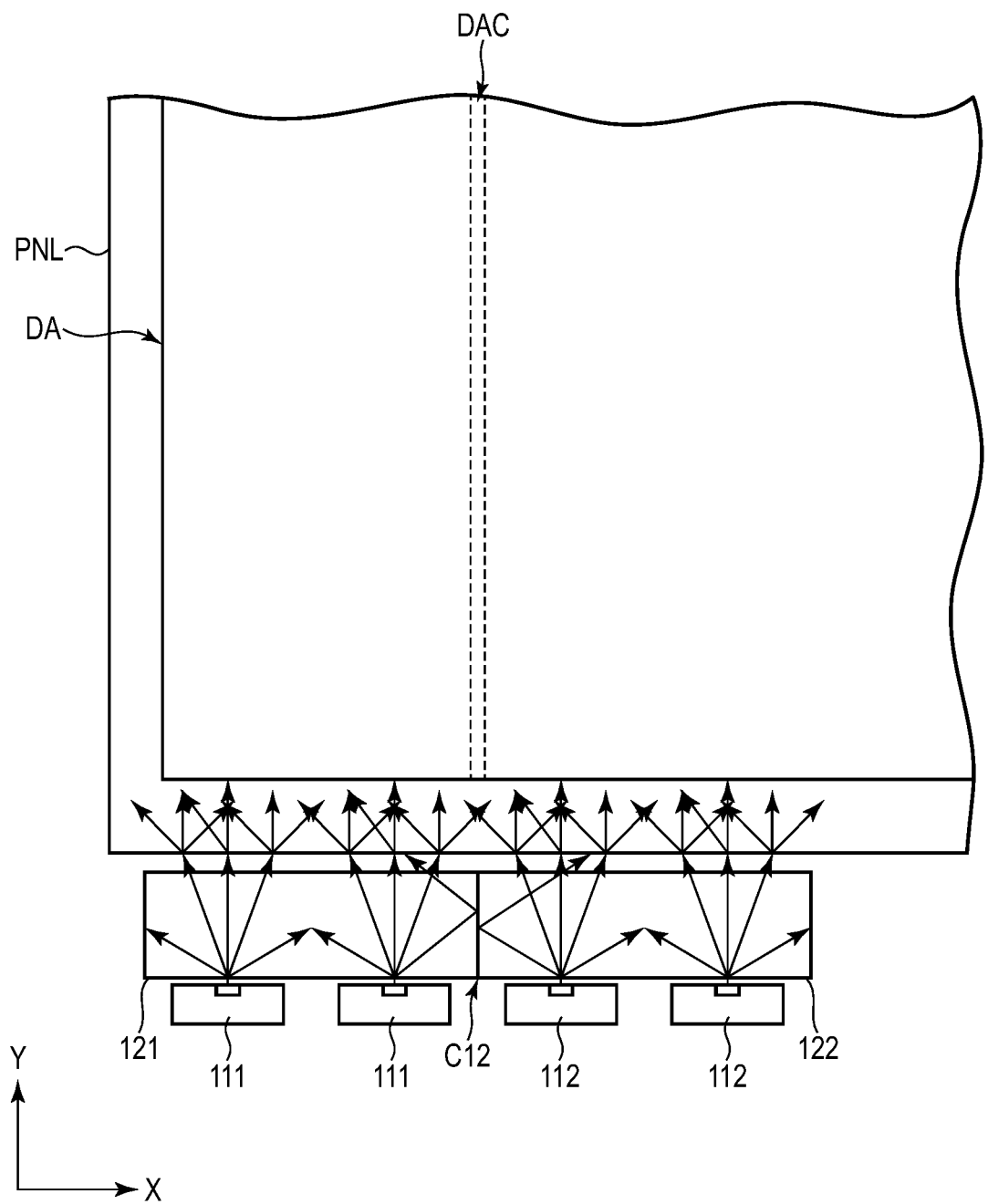
F I G. 6

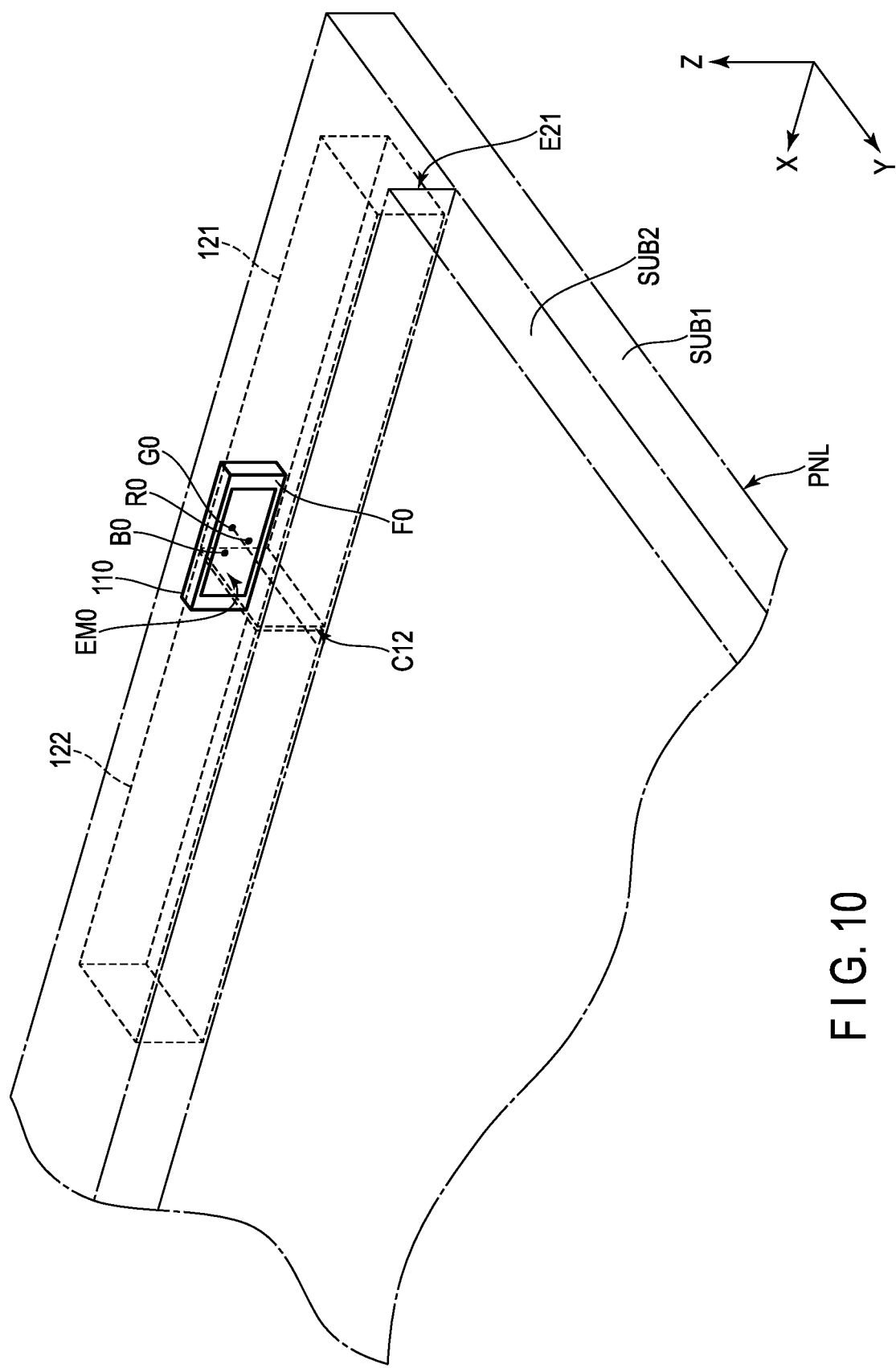
F I G. 10

DISPLAY DEVICE

CROSS-REFERENCE TO RELATED APPLICATIONS

This application is a Continuation Application of PCT Application No. PCT/JP2020/022073, filed Jun. 4, 2020 and based upon and claiming the benefit of priority from Japanese Patent Application No. 2019-152740, filed Aug. 23, 2019, the entire contents of all of which are incorporated herein by reference.

FIELD

Embodiments described herein relate generally to a display device.

BACKGROUND

In recent years, various illumination devices including a light modulating element exhibiting scattering property or transparency to light have been proposed. For example, the light modulating element includes a polymer dispersed liquid crystal layer as a light modulating layer. The light modulating element is disposed behind a light guide plate and scatters light incident from a side surface of the light guide plate.

Light emitted from a plurality of light emitting elements arranged spaced apart propagates inside the light guide plate while diffusing. In an area near the light emitting elements in the light guide plate, the light from the light emitting elements may not sufficiently mix with each other. In this case, a risk of visually recognizing brightness and darkness of light as non-uniformity in stripe may be increased.

BRIEF DESCRIPTION OF THE DRAWINGS

FIG. 6 is a plane view showing a propagation state of light emitted from the light sources 111 and 112.

FIG. 10 is a perspective view showing a third configuration example of a light source 110 shown in FIG. 3.

DETAILED DESCRIPTION

Figure 1:
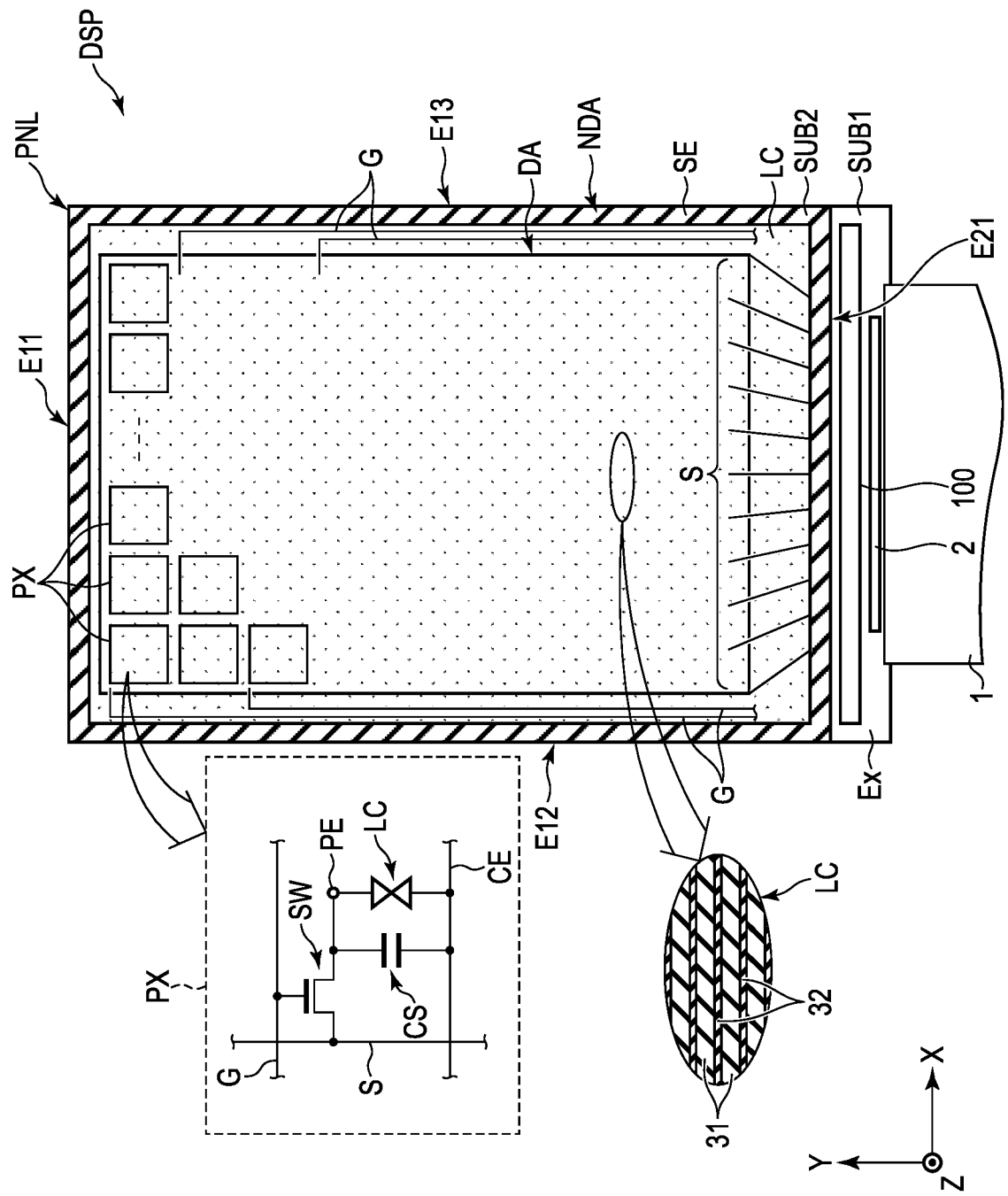
FIG. 1 is a plane view showing a configuration example of a display device DSP of an embodiment.

In general, according to one embodiment, a display device includes a display panel including a polymer dispersed liquid crystal layer; and a light-emitting module provided along a side surface of the display panel, wherein the light-emitting module includes: a first light source having a first light-emitting point; a second light source having a second light-emitting point of a same color as the first light-emitting point; a first light guide provided between the first light source and the side surface; and a second light guide provided between the second light source and the side surface, the second light guide forming a contact portion in contact with the first light guide, the first light guide and the second light guide are arranged in a first direction, and a distance between the contact portion and the first light-emitting point along the first direction is equal to a distance between the contact portion and the second light-emitting point along the first direction.

According to another embodiment, a display device includes: a display panel including a polymer dispersed liquid crystal layer; and a light-emitting module provided along a side surface of the display panel, wherein the light-emitting module includes: a first light source having a first red light-emitting point, a first green light-emitting point, and a first blue light-emitting point; a second light source having a second red light-emitting point, a second green light-emitting point, and a second blue light-emitting point; a first light guide provided between the first light source and the side surface; and a second light guide provided between the second light source and the side surface, the second light guide forming a contact portion in contact with the first light guide, the first light guide and the second light guide are arranged in a first direction, and a center between the first green light-emitting point and the second green light-emitting point is nearer to the contact portion than a center between the first red light-emitting point and the second red light-emitting point and a center between the first blue light-emitting point and the second blue light-emitting point.

According to still another embodiment, a display device includes: a display panel including a polymer dispersed liquid crystal layer; and a light-emitting module provided along a side surface of the display panel, wherein the light-emitting module includes: a first light source having a light-emitting point; a first light guide provided between the first light source and the side surface; and a second light guide provided between the first light source and the side surface, the second light guide forming a contact portion in contact with the first light guide, the first light guide and the second light guide are arranged in a first direction, and the contact portion overlaps the light-emitting point in a second direction intersecting the first direction.

According to one embodiment, it is possible to provide a display device capable of suppressing degradation in display quality.

Embodiments will be described hereinafter with reference to the accompanying drawings. The disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same or similar elements as or to those described in connection with preceding drawings or those exhibiting similar functions are denoted by like reference numerals, and a detailed description thereof is omitted unless otherwise necessary.

FIG. 1 is a plan view showing a configuration of a display device DSP according to one embodiment. In this embodiment, a first direction X, a second direction Y and a third direction Z are orthogonal to each other, but they may intersect at an angle other than 90 degrees.

The first direction X and the second direction Y correspond to directions parallel to a main surface of a substrate which constitutes the display device DSP, and the third direction Z corresponds to a thickness direction of the display device DSP. Further, viewing from above downward onto an X-Y plane defined by the first direction X and the second direction Y is referred to as planar view.

The display device DSP includes a display panel PNL including a polymer dispersed liquid crystal layer (hereinafter, simply referred to as a liquid crystal layer LC), a wiring substrate 1, an IC chip 2, and a light-emitting module 100.

The display panel PNL includes a first substrate SUB1, a second substrate SUB2, a liquid crystal layer LC, and a sealant SE. The first substrate SUB1 and the second substrate SUB2 overlap each other in planar view. The first substrate SUB1 and the second substrate SUB2 are bonded together by the sealant SE. The liquid crystal layer LC is held between the first substrate SUB1 and the second substrate SUB2, and is sealed by the sealant SE.

As schematically shown in an enlarged manner in FIG. 1, the liquid crystal layer LC includes polymers 31 and liquid crystal molecules 32. For example, the polymers 31 are liquid crystal polymers. The polymers 31 are formed in a streak shape extending along the first direction X and are arranged in the second direction Y. The liquid crystal molecules 32 are dispersed in gaps between the polymers 31, and are aligned such that their major axes are along the first direction X. Each of the polymers 31 and the liquid crystal molecules 32 has optical anisotropy or refractive anisotropy. The responsiveness of the polymers 31 to an electric field is lower than the responsiveness of the liquid crystal molecules 32 to the electric field.

For example, the alignment direction of the polymers 31 hardly changes regardless of the presence or absence of the electric field. In contrast, the alignment direction of the liquid crystal molecules 32 changes according to the electric field in a state where a high voltage equal to or higher than a threshold value is applied to the liquid crystal layer LC. In a state where no voltage is applied to the liquid crystal layer LC, the optical axes of the polymers 31 and the liquid crystal molecules 32 are parallel to each other, and the light incident on the liquid crystal layer LC is transmitted almost without being scattered in the liquid crystal layer LC (transparent state). In a state where a voltage is applied to the liquid crystal layer LC, the optical axes of the polymers 31 and the liquid crystal molecules 32 intersect each other, and the light incident on the liquid crystal layer LC is scattered in the liquid crystal layer LC (scattered state).

The display panel PNL includes a display portion DA configured to display an image and a frame-shaped non-display portion NDA that surrounds the display portion DA. The sealant SE is located in the non-display portion NDA. The display portion DA includes pixels PX arrayed in a matrix in the first direction X and the second direction Y.

As shown in an enlarged manner in FIG. 1, each pixel PX includes a switching element SW, a pixel electrode PE, a common electrode CE, a liquid crystal layer LC, and the like. The switching element SW is constructed from, for example, a thin-film transistor (TFT) and is electrically connected to a scanning line G and a signal line S. The scanning line G is electrically connected to the switching element SW in each of the pixels PX arranged in the first direction X. The signal line S is electrically connected to the switching element SW in each of the pixels PX arranged in the second direction Y. The pixel electrode PE is electrically connected to the switching element SW. The common electrode CE is provided in common for a plurality of the pixel electrodes PE. The liquid crystal layer LC (in particular, liquid crystal molecules 32) is driven by an electric field generated between the pixel electrode PE and the common electrode CE. A capacitance CS is formed, for example, between an electrode having the same electric potential as the common electrode CE and an electrode having the same electric potential as the pixel electrode PE.

As will be described later, the scanning line G, the signal line S, the switching element SW, and the pixel electrode PE are provided on the first substrate SUB1, and the common electrode CE is provided on the second substrate SUB2. In the first substrate SUB1, the scanning line G and the signal line S are electrically connected to the wiring substrate 1 or the IC chip 2.

The wiring substrate 1 and the IC chip 2 are mounted on an extended portion Ex of the first substrate SUB1. The extended portion Ex corresponds to a portion of the first substrate SUB1 that does not overlap the second substrate SUB2. The wiring substrate 1 is, for example, a bendable flexible printed circuit board. The IC chip 2 incorporates, for example, a display driver that outputs a signal necessary for image display. Incidentally, the IC chip 2 may be mounted on the wiring substrate 1.

Although details of the light-emitting module 100 will be described later, the light-emitting module 100 is provided along a side surface (or an edge portion) of the display panel PNL and emits light toward the side surface. The side surface of the display panel PNL in the present embodiment may be either the side surface of the first substrate SUB1 or that of the second substrate SUB2, or may be both the side surface of the first substrate SUB1 and that of the second substrate SUB2.

In the example shown in FIG. 1, the light-emitting module 100 overlaps the extended portion Ex in planar view, and a side surface E21 of the second substrate SUB2 corresponds to the side surface of the display panel PNL. In other words, the light-emitting module 100 is provided along the side surface E21. Incidentally, the light-emitting module 100 may be provided along another side surface of the display panel PNL, for example, may be provided along a side surface E11 opposite to the side surface E21, or may be provided along another side surface 512 or E13. The side surfaces E11 to E13 include the side surface of the first substrate SUB1 and the side surface of the second substrate SUB2. In this case, the light-emitting module 100 may emit light toward either the side surface of the first substrate SUB1 or that of the second substrate SUB2, or may emit light toward both the side surface of the first substrate SUB1 and that of the second substrate SUB2.

The light-emitting module 100 may be provided along a shorter side of the display panel PNL or may be provided along a longer side of the display panel PNL. In the example shown in FIG. 1, the side surfaces E11 and E21 are side surfaces formed along the shorter side of the display panel PNL, and the side surfaces E12 and E13 are side surfaces formed along the longer side of the display panel PNL. However, when the light-emitting module 100 is provided along the side surface E12 or E13, the polymers 31 of the liquid crystal layer LC are formed in a streak shape extending along the second direction Y, and the liquid crystal molecules 32 are aligned such that their major axes are along the second direction Y.

Figure 2:
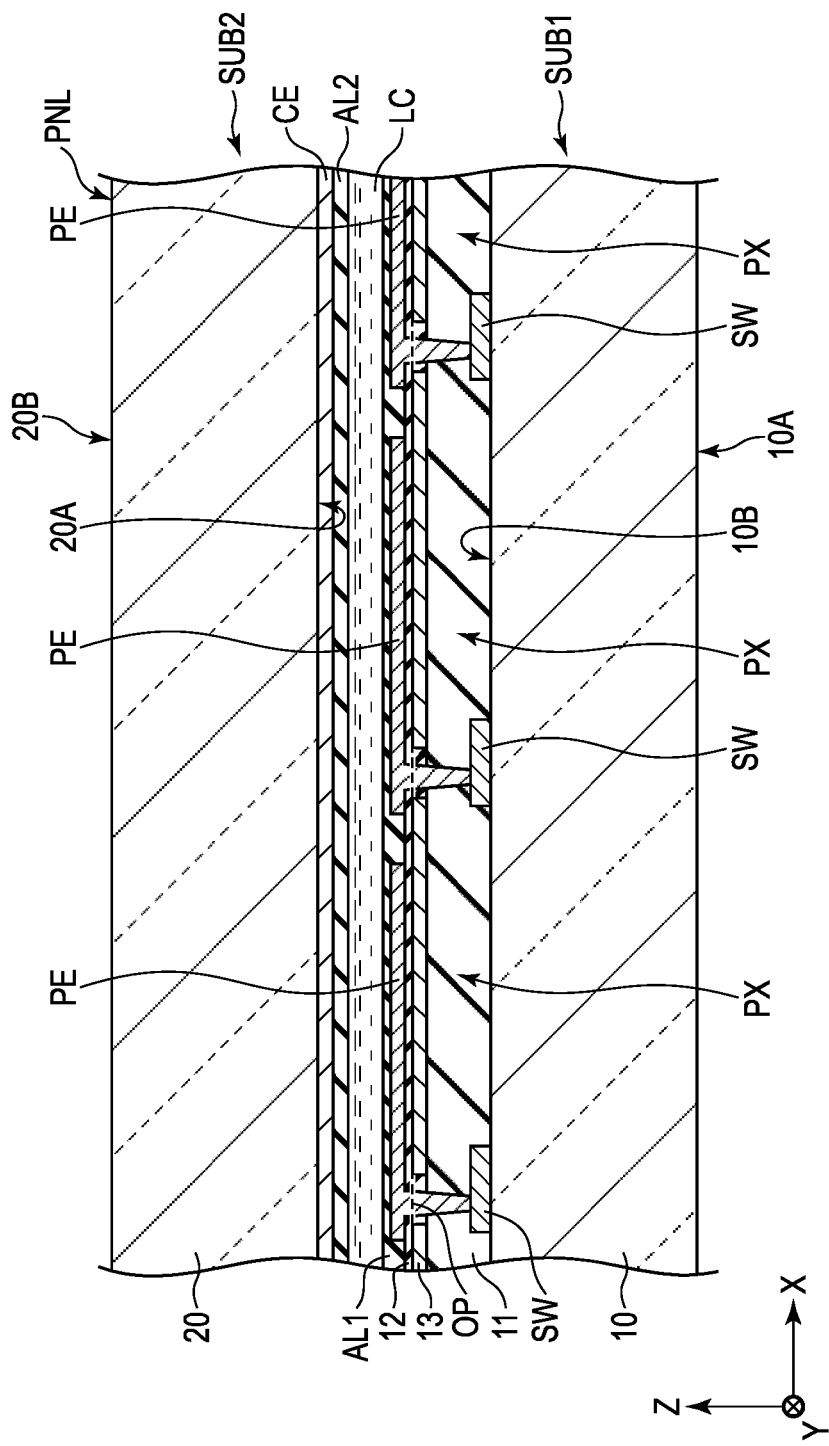
FIG. 2 is a cross-sectional view showing a configuration example of a display panel PNL shown in FIG. 1.

FIG. 2 is a cross-sectional view showing a configuration example of the display panel PNL shown in FIG. 1.

The first substrate SUB1 includes a transparent substrate 10, insulating films 11 and 12, a capacitive electrode 13, the switching element SW, the pixel electrode PE, and an alignment film AL1. The transparent substrate 10 includes a main surface (outer surface) 10A and a main surface (inner surface) 10B opposite to the main surface 10A. The switching element SW is provided on the main surface 10B side. The insulating film 11 is provided on the main surface 10B and covers the switching element SW. Incidentally, the scanning lines G and the signal lines S shown in FIG. 1 are provided between the transparent substrate 10 and the insulating film 11, but are not shown here. The capacitive electrode 13 is provided between the insulating films 11 and 12. The pixel electrode PE is provided for each pixel PX between the insulating film 12 and the alignment film AL1. In other words, the capacitive electrode 13 is provided between the transparent substrate 10 and the pixel electrode PE. The pixel electrode PE is electrically connected to the switching element SW via an opening portion OP of the capacitive electrode 13. The pixel electrode PE overlaps the capacitive electrode 13 with the insulating film 12 interposed therebetween to form the capacitance CS of the pixel PX. The alignment film AL1 covers the pixel electrode PE. The alignment film AL1 is in contact with the liquid crystal layer LC.

The second substrate SUB2 includes a transparent substrate 20, the common electrode CE, and an alignment film AL2. The transparent substrate 20 includes a main surface (inner surface) 20A and a main surface (outer surface) 20B opposite to the main surface 20A. The main surface 20A of the transparent substrate 20 faces the main surface 10B of the transparent substrate 10. The common electrode CE is provided on the main surface 20A. The alignment film AL2 covers the common electrode CE. The alignment film AL2 is in contact with the liquid crystal layer LC. Incidentally, in the second substrate SUB2, a light-shielding layer may be provided directly above the switching elements SW, the scanning lines G, and the signal lines S. In addition, a transparent insulating film may be provided between the transparent substrate 20 and the common electrode CE or between the common electrode CE and the alignment film AL2. The common electrode CE is disposed over the plurality of pixels PX and is opposed to the plurality of pixel electrodes PE in the third direction Z. In addition, the common electrode CE is electrically connected to the capacitive electrode 13, and has the same electric potential as the capacitive electrode 13.

The liquid crystal layer LC is located between the pixel electrode PE and the common electrode CE.

The transparent substrates 10 and 20 are, for example, glass substrates, but may be insulating substrates such as plastic substrates. The insulating film 11 includes, for example, a transparent inorganic insulating film such as silicon oxide, silicon nitride, or silicon oxynitride, and a transparent organic insulating film such as acrylic resin. The insulating film 12 is a transparent inorganic insulating film such as silicon nitride. The capacitive electrode 13, the pixel electrode PE, and the common electrode CE are transparent electrodes formed of a transparent conductive material such as indium tin oxide (ITO) or indium zinc oxide (IZO). The alignment films AL1 and AL2 are horizontal alignment films having an alignment restriction force approximately parallel to the X-Y plane. For example, the alignment films AL1 and AL2 are subjected to alignment treatment along the first direction X. Incidentally, the alignment treatment may be rubbing treatment or optical alignment treatment.

Figure 3:
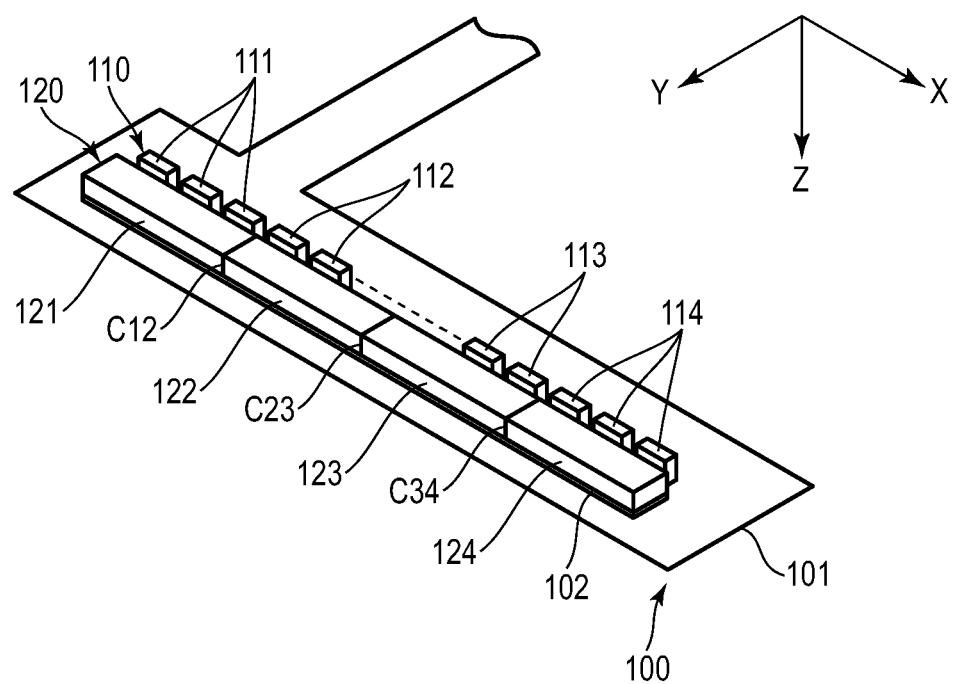
FIG. 3 is a perspective view showing a configuration example of a light-emitting module 100 shown in FIG. 1.

FIG. 3 is a perspective view showing a configuration example of the light-emitting module 100 shown in FIG. 1. The light-emitting module 100 includes a wiring substrate 101, an adhesive layer 102, a plurality of light sources 110, and a plurality of light guides (prism lenses) 120. Incidentally, FIG. 3 shows an example in which the light-emitting module 100 includes four light guides 121 to 124, but the number of light guides is not limited to the example shown. In addition, although FIG. 3 shows an example in which three light sources face each light guide, the number of light sources is not limited to the example shown.

The plurality of light sources 110 include light sources 111 to 114. The plurality of light sources 111 face the light guide 121 in the second direction Y. Similarly, the plurality of light sources 112 face the light guide 122, the plurality of light sources 113 face the light guide 123, and the plurality of light sources 114 face the light guide 124.

The plurality of light sources 111 to 114 are arranged spaced apart along the first direction X and electrically connected to the wiring substrate 101. The light sources 111 to 114 basically have the same specification, and are, for example, white light sources that emit white light. Examples of the light source applicable to the present embodiment include a light emitting element incorporating a red light-emitting chip, a green light-emitting chip, and a blue light-emitting chip, and a light emitting element incorporating a blue light-emitting chip and a yellow phosphor. The light-emitting chip of each color is, for example, a light-emitting diode. The light-emitting chip emits point-like light as referred to as a point source. The presence of the light-emitting chip can be recognized as a light-emitting point that emits point-like light when light is emitted.

The plurality of light guides 121 to 124 are made of resin, for example, are each formed in a transparent rod shape, and extend along the first direction X. The plurality of light guides 121 to 124 are arranged along the first direction X, and two adjacent light guides thereof are disposed in a state where their edge portions are in contact with each other. In other words, the light guides 121 and 122 form a contact portion C12, the light guides 122 and 123 form a contact portion C23, and the light guides 123 and 124 form a contact portion C34. Each of the light guides 121 to 124 is bonded to the wiring substrate 101 with the adhesive layer 102. Incidentally, in the contact portions C12, C23, and C34, no adhesive is interposed. In other words, the light guides 121 and 122 are not bonded to each other, the light guides 122 and 123 are not bonded to each other, and the light guides 123 and 124 are not bonded to each other.

Figure 4:
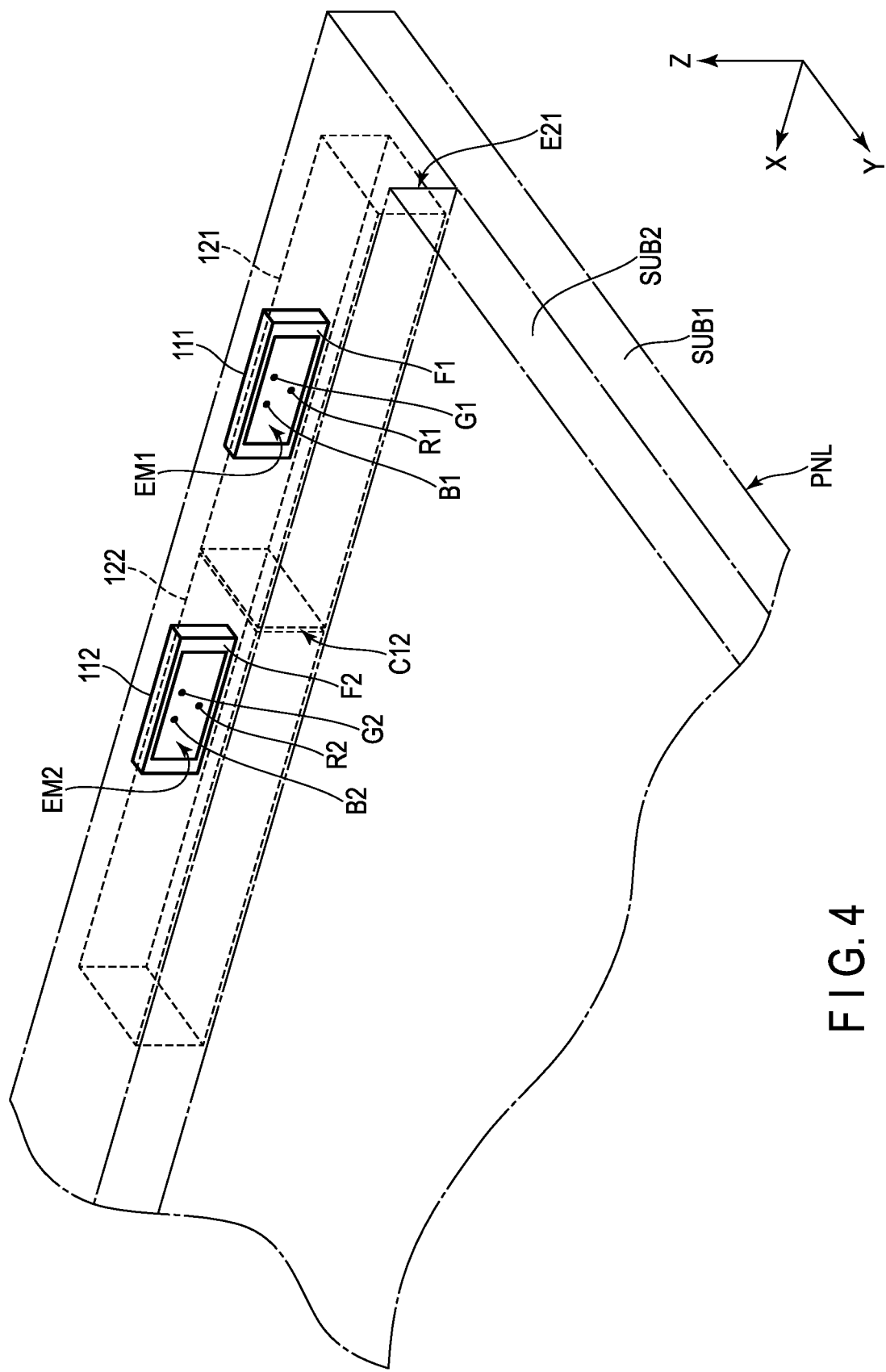
FIG. 4 is a perspective view showing a first configuration example of light sources 111 and 112 shown in FIG. 3.

FIG. 4 is a perspective view showing a first configuration example of the light sources 111 and 112 shown in FIG. 3.

In FIG. 4, the light guides 121 and 122 are indicated by dotted lines, and the display panel PNL is indicated by dash-dotted lines. The light source 111 has a light-emitting surface EM1 surrounded by a frame F1 in an X-Z plane defined by the first direction X and the third direction Z. The light source 111 has a red light-emitting point R1, a green light-emitting point G1, and a blue light-emitting point B1 on the light-emitting surface EM1. In the example shown in FIG. 4, the red light-emitting point R1, the green light-emitting point G1, and the blue light-emitting point B1 are disposed so as to correspond to vertices of a triangle in the X-Z plane, but may be disposed in line along the first direction X. The light source 112 is also constructed in the same manner as the light source 111, and the light source 112 has a red light-emitting point R2, a green light-emitting point G2, and a blue light-emitting point B2 on the light-emitting surface EM2 surrounded by a frame F2.

The light guide 121 is provided between the light source 111 and the side surface E21 of the display panel PNL. The light guide 122 is provided between the light source 112 and the side surface E21. The contact portion C12 is located between the light source 111 and the light source 112.

In the light source 111, red light emitted from the red light-emitting point R1, green light emitted from the green light-emitting point G1, and blue light emitted from the blue light-emitting point B1 are incident on the light guide 121. The light incident on the light guide 121 is appropriately diffused in the light guide 121 and is incident on the display panel PNL. Similarly, the light emitted from the light source 112 is incident on the display panel PNL through the light guide 122.

Figure 5:
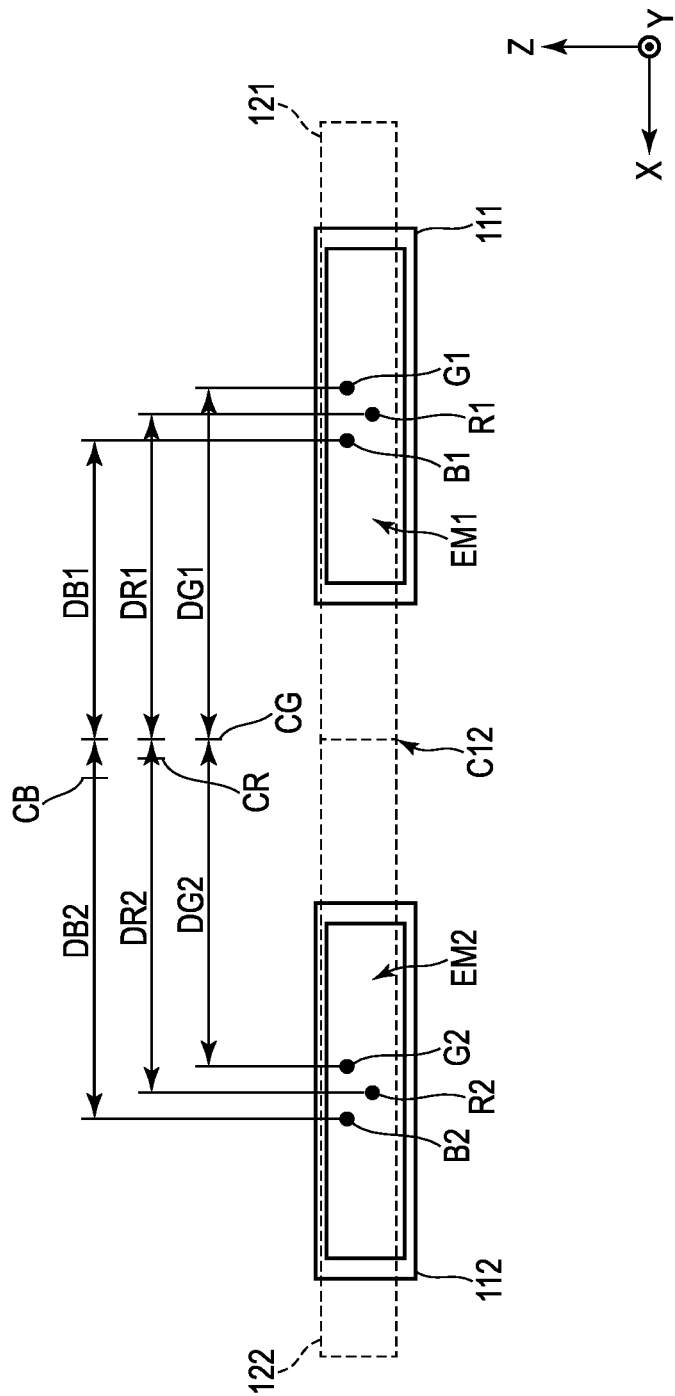
FIG. 5 is a front view showing light-emitting surfaces of the light sources 111 and 112 shown in FIG. 4.

FIG. 5 is a front view showing light-emitting surfaces of the light sources 111 and 112 shown in FIG. 4. In FIG. 5, the light guides 121 and 122 are indicated by dotted lines. Here, a positional relationship between the light sources 111 and 112 arranged in the first direction X and the contact portion C12 will be described. In the light sources 111 and 112, light-emitting points of the same color are noted. A distance DG1 between the contact portion C12 and the green light-emitting point G1 along the first direction X is approximately equal to a distance DG2 between the contact portion C12 and the green light-emitting point G2 along the first direction X (DG1≈DG2). In other words, the contact portion C12 is located in the vicinity of a center CG between the green light-emitting points G1 and G2 adjacent to each other in the first direction X. The center here corresponds to a midpoint between light-emitting points of the same color adjacent to each other in the first direction X or a position equidistant from the light-emitting points of the same color. In addition, a distance described below corresponds to a distance along the first direction X unless otherwise specified.

A distance DR1 between the contact portion C12 and the red light-emitting point R1 is smaller than a distance DR2 between the contact portion C12 and the red light-emitting point R2 (DR1<DR2). Incidentally, the distance DR1 is smaller than the distance DG1, and the distance DR2 is larger than the distance DG2.

A distance DB1 between the contact portion C12 and the blue light-emitting point B1 is smaller than a distance DB2 between the contact portion C12 and the blue light-emitting point B2 (DB1<DB2). Incidentally, the distance DB1 is smaller than the distance DR1, and the distance DB2 is larger than the distance DR2.

A center CR between the red light-emitting points R1 and R2 adjacent to each other in the first direction X is shifted to the light source 112 side from the center CG. A center CB between the blue light-emitting points B1 and B2 adjacent to each other in the first direction X is shifted to the light source 112 side from the center CR. In other words, the center CG is nearer to the contact portion C12 than the centers CR and CB. An amount of shift between the center CG and the contact portion C12 along the first direction X is desirably 0.5 mm or less, and more desirably 0.2 mm or less. In the example shown in FIG. 5, the center CB is most spaced apart from the contact portion C12, but the center CR may be most spaced apart from the contact portion C12.

FIG. 6 is a plane view showing a propagation state of light emitted from the light sources 111 and 112. Light emitted from the light sources 111 adjacent to each other is incident on the light guide 121, appropriately mixed in the light guide 121, diffused, incident on the display panel PNL, and reaches the display portion DA. Light emitted from the light sources 112 is incident on the light guide 122, appropriately mixed in the light guide 122, diffused, incident on the display panel PNL, and reaches the display portion DA.

For the light emitted from the light sources 111 and 112 adjacent to each other with the contact portion C12 interposed therebetween, when an air layer exists in the contact portion C12, there may be a case where light that does not satisfy a total reflection condition among the emitted light from the light source 111 is incident on the light guide 122 beyond the contact portion C12, and there may be a case where light that does not satisfy the total reflection condition among the emitted light from the light source 112 is incident on the light guide 121 beyond the contact portion C12. Among the emitted light from the light source 111, light satisfying the total reflection condition is totally reflected by the contact portion C12, and is incident on the display panel PNL while being diffused in the light guide 121. Similarly, among the light emitted from the light source 112, light not satisfying the total reflection condition is totally reflected by the contact portion C12, and is incident on the display panel PNL while being diffused in the light guide 122.

As described above, the light-emitting module 100 applied in the present embodiment includes the plurality of light guides 120. As a light entrance (such as the side surface E21 shown in FIG. 1) of the display panel PNL becomes longer, more light sources 110 need to be disposed. The light guide 120 is provided between the light entrance and the light source 110, and the light guide 120 is required to have a function such as appropriate diffusion of the light from the light source 110. When the number of light sources 110 is large, the light guide 120 is required to have a long length. In contrast, deformation such as a warp is likely to be caused in the light guide 120 having a long length, so that a risk of not sufficiently exerting the required function may be increased. When the width of the light guide 120 is expanded from the viewpoint of suppressing warp or the like, a light guide distance from the light source 110 to the light entrance becomes long, which may increase a risk of reducing utilization efficiency of light.

Therefore, as in the present embodiment, it is effective to prepare a plurality of light guides 120 having a length that does not cause a warp and provide the light guides between the light source 110 and the light entrance. At this time, if a gap (air layer) is generated between the light guides 120 adjacent to each other, light is not sufficiently diffused in the gap, and light from the light source 110 hardly reaches a desired portion of the display portion DA. For example, in FIG. 6, in the display portion DA, light from the light source 110 is less likely to reach a portion DAC on the same straight line as the contact portion C12 along the second direction Y, which may increase a risk of visually recognizing a difference in luminance as a dark line. For this reason, the light guides 120 adjacent to each other are disposed in contact with each other almost without generating a gap.

Among red, green, and blue, green is the color with the highest luminous efficacy of human eyes. The luminance of green light contributes more to display than the luminance of each of red light and blue light. In the present embodiment, the contact portion C12 is located substantially equidistant from the green light-emitting points G1 and G2. For this reason, even if green light from the green light-emitting point G1 and green light from the green light-emitting point G2 are each reflected by the contact portion C12, the luminance of the green light on both sides of the contact portion C12 is approximately equal. This prevents the luminance difference along the contact portion C12 from being visually recognized. Therefore, in the display portion DA, stripe non-uniformity in display caused by brightness and darkness of light is suppressed, which makes it possible to suppress degradation in display quality.

Figure 7:
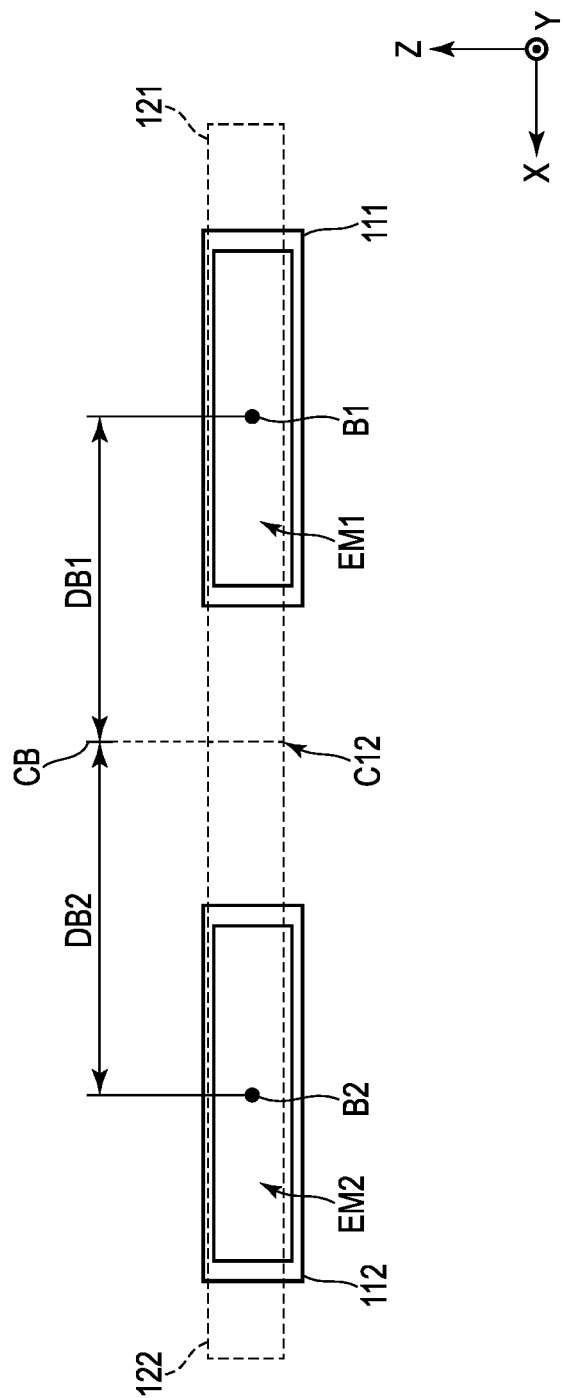
FIG. 7 is a front view showing a second configuration example of the light sources 111 and 112.

FIG. 7 is a front view showing a second configuration example of the light sources 111 and 112. In FIG. 7, the light guides 121 and 122 are indicated by dotted lines. The second configuration example shown in FIG. 7 is different from the first configuration example shown in FIG. 5 in that the light source 111 has only the blue light-emitting point B1 as a light-emitting point and the light source 112 has only the blue light-emitting point B2 as a light-emitting point. That is, the second configuration example corresponds to a case where the light sources 111 and 112 are light emitting elements incorporating a blue light-emitting chip and a yellow phosphor. In these light emitting elements, blue light from the blue light-emitting chip (or blue light-emitting point) excites the yellow phosphor to emit white light.

Here, the positional relationship between the light sources 111 and 112 arranged in the first direction X and the contact portion C12 will be described. The distance DB1 between the contact portion C12 and the blue light-emitting point B1 is approximately equal to the distance DB2 between the contact portion C12 and the blue light-emitting point B2 (DB1≈DB2). In other words, the contact portion C12 is located in the vicinity of the center CB between the blue light-emitting points B1 and B2 adjacent to each other in the first direction X.

According to this second configuration example, even if emitted light from the blue light-emitting point B1 and emitted light from the blue light-emitting point B2 are each reflected by the contact portion C12, the luminance of the blue light (or white light) on both sides of the contact portion C12 is approximately equal. For this reason, even in the second configuration example, the same effect as in the above-mentioned first configuration example can be obtained.

Next, a relationship between pitches of the light sources and lengths of the light guides in the light-emitting module 100 will be described with reference to FIGS. 8 and 9. Incidentally, the light-emitting points of the light sources 111 to 114 described in the following examples are all light-emitting points of the same color. For example, when the above-mentioned first configuration example is assumed, all the light-emitting points of the light sources 111 to 114 have a green color. In addition, when the above-mentioned second configuration example is assumed, all the light-emitting points of the light sources 111 to 114 have a blue color.

Figure 8:
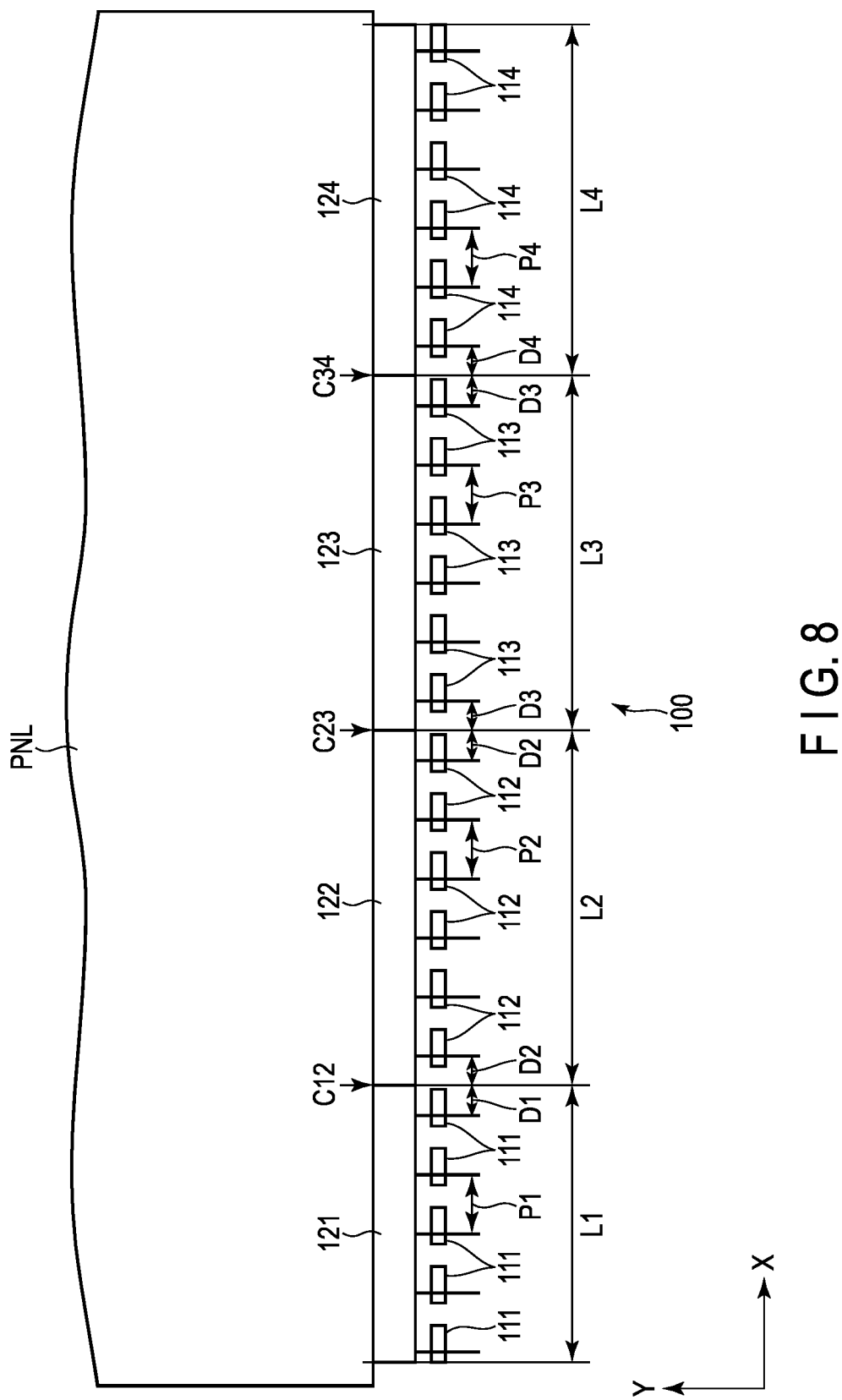
FIG. 8 is a plane view showing an example of a relationship between pitches of the light sources and lengths of light guides.

FIG. 8 is a plane view showing an example of the relationship between pitches of the light sources and lengths of the light guides. As described above, the contact portion C12 is located substantially equidistant from the light-emitting point of the light source 111 and the light-emitting point of the light source 112 (D1≈D2). Similarly, the contact portion C23 is located substantially equidistant from the light-emitting point of the light source 112 and the light-emitting point of the light source 113 (D2≈D3). Similarly, the contact portion C34 is located substantially equidistant from the light-emitting point of the light source 113 and the light-emitting point of the light source 114 (D3≈D4).

The plurality of light sources 111 facing the light guide 121 are arranged at the same pitch P1 along the first direction X. The plurality of light sources 112 facing the light guide 122 are arranged at the same pitch P2 along the first direction X. The plurality of light sources 113 facing the light guide 123 are arranged at the same pitch P3 along the first direction X. The plurality of light sources 114 facing the light guide 124 are arranged at the same pitch P4 along the first direction X. The pitches P1 to P4 are all equal. In addition, each of the pitches P1 to P4 corresponds to a sum of distances D1 and D2, a sum of distances D2 and D3, or a sum of distances D3 and D4.

When all the light sources 111 to 114 in the light-emitting module 100 are arranged at regular pitches, and the light guides 121 to 124 have the same lengths L1 to L4 along the first direction X, the contact portions are not necessarily located substantially equidistant from adjacent light-emitting points. In the example shown in FIG. 8, the length L1 of the light guide 121 is different from the length L2 of the light guide 122 (L1≠L2). In other words, by appropriately combining a plurality of light guides having different lengths while all the light sources 111 to 114 are arranged at regular pitches, the contact portions are disposed substantially equidistant from adjacent light-emitting points as in the above-mentioned first and second configuration examples. According to the light-emitting module 100 constructed as described above, the above effect can be obtained.

Figure 9:
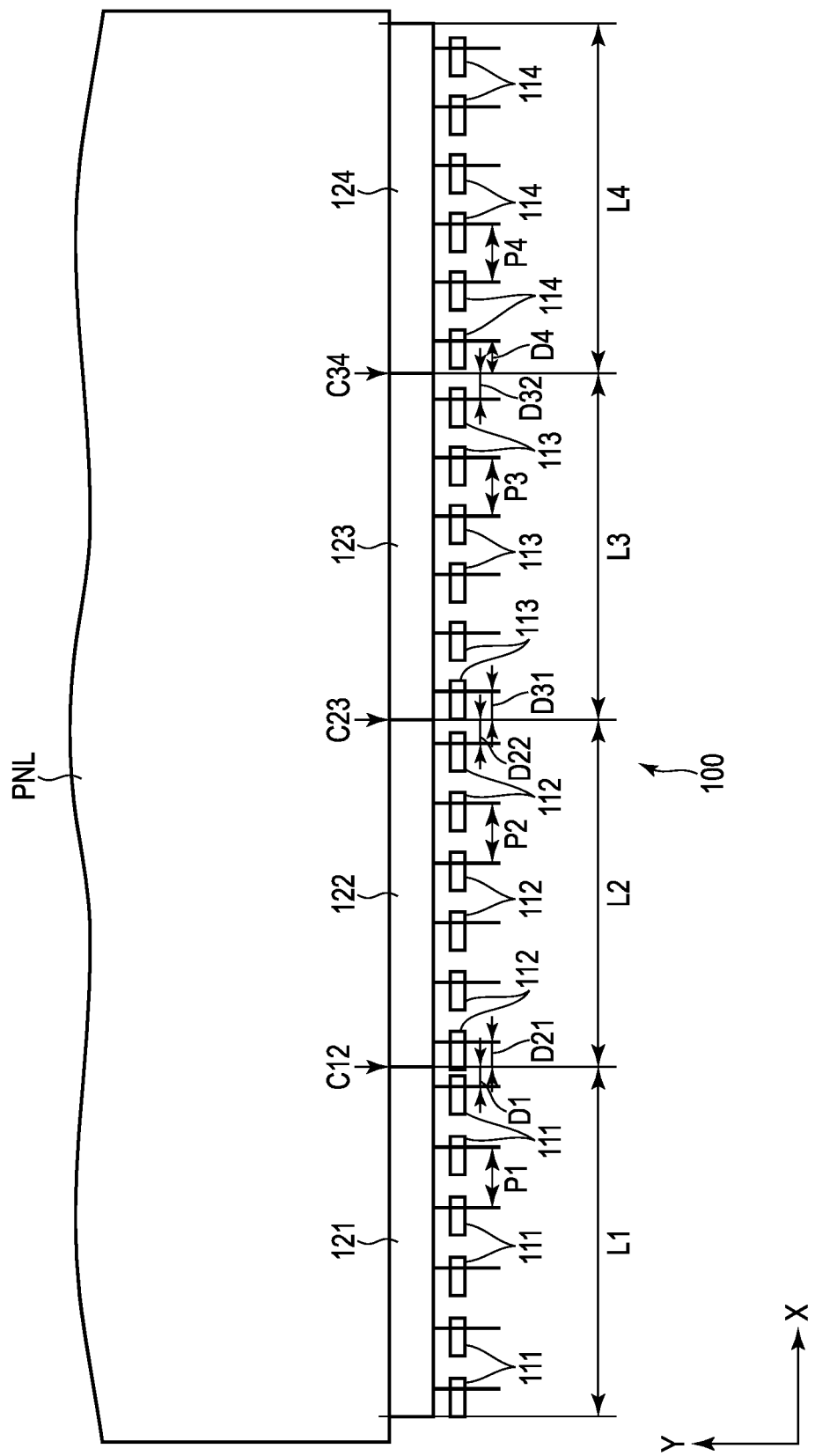
FIG. 9 is a plane view showing another example of the relationship between pitches of the light sources and lengths of the light guides.

FIG. 9 is a plane view showing another example of the relationship between pitches of the light sources and lengths of the light guides. The contact portion C12 is located substantially equidistant from the light-emitting point of the light source 111 and the light-emitting point of the light source 112 (D1≈D21). Similarly, the contact portion C23 is located substantially equidistant from the light-emitting point of the light source 112 and the light-emitting point of the light source 113 (D22 D31). Similarly, the contact portion C34 is located substantially equidistant from the light-emitting point of the light source 113 and the light-emitting point of the light source 114 (D32 D4). Incidentally, the distances D21 and D22 are not necessarily equal, and the distance D21 may be different from the distance D22. In addition, the distances D31 and D32 are not necessarily equal, and the distance D31 may be different from the distance D32.

The light guides 121 to 124 have the same lengths L1 to L4 along the first direction X, respectively (L1=L2=L3=L4).

The plurality of light sources 111 are arranged at the same pitch P1 along the first direction X. The plurality of light sources 112 are arranged at the same pitch P2 along the first direction X. The plurality of light sources 113 are arranged at the same pitch P3 along the first direction X. The plurality of light sources 114 are arranged at the same pitch P4 along the first direction X. In the example shown in FIG. 9, the pitch P1 is different from the pitch P2. In addition, the pitch P4 is different from the pitch P3. For example, the pitch P1 is larger than the pitch P2, the pitch P2 is equal to the pitch P3, and the pitch P3 is larger than the pitch P4 (P1>P2=P3>P4). As described above, by appropriately combining the light sources 111 to 114 arranged at different pitches while all the light guides 121 to 124 have the same length, the contact portions are disposed substantially equidistant from adjacent light-emitting points as in the above-mentioned first and second configuration examples. According to the light-emitting module 100 constructed as described above, the above effect can be obtained.

FIG. 10 is a perspective view showing a third configuration example of the light source 110 shown in FIG. 3. In FIG. 10, the light guides 121 and 122 are indicated by dotted lines, and the display panel PNL is indicated by dash-dotted lines. The light source 110 has a light-emitting surface EM0 surrounded by a frame F0 in the X-Z plane. The light source 110 has a red light-emitting point R0, a green light-emitting point G0, and a blue light-emitting point B0 on the light-emitting surface EM0.

The light guide 121 is provided between the light source 110 and the side surface E21 of the display panel PNL. The light guide 122 is provided between the light source 110 and the side surface E21.

Figure 11:
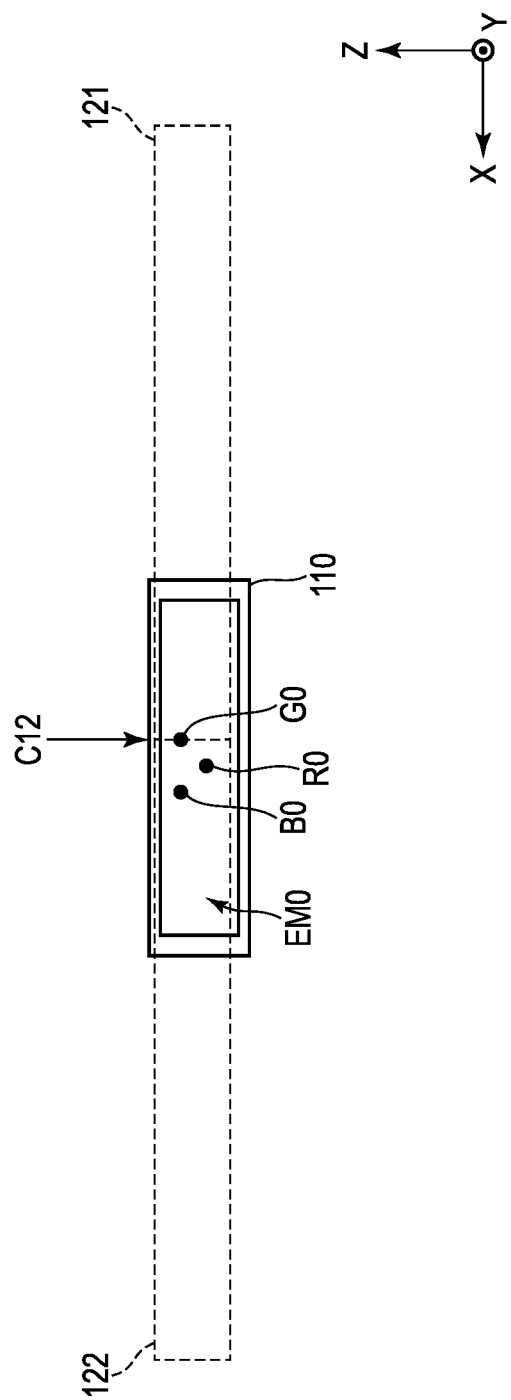
FIG. 11 is a front view showing a light-emitting surface of the light source 110 shown in FIG. 10.

FIG. 11 is a front view showing the light-emitting surface of the light source 110 shown in FIG. 10. In FIG. 11, the light guides 121 and 122 are indicated by dotted lines. Here, a positional relationship between the light source 110 and the contact portion C12 will be described. The contact portion C12 overlaps the green light-emitting point G0 in the second direction Y. In other words, the contact portion C12 is located directly in front of the green light-emitting point G0. In other words, as shown in FIG. 10, the contact portion C12 extends along the second direction Y, and the green light-emitting point G0 is located in line with the contact portion C12. The red light-emitting point R0 and the blue light-emitting point B0 do not overlap the contact portion C12, and are shifted from the contact portion C12 in the first direction X.

According to this third configuration example, green light from the green light-emitting point G0 is incident on the light guides 121 and 122, appropriately diffused in the light guides 121 and 122, incident on the display panel PNL, and reaches the display portion DA. In addition, even if green light incident on the light guide 121 and green light incident on the light guide 122 are each reflected by the contact portion C12, the luminance of the green light on both sides of the contact portion C12 is approximately equal. This prevents the luminance difference along the contact portion C12 from being visually recognized. Therefore, even in the third configuration example, the same effect as in the above-mentioned first configuration example can be obtained.

Figure 12:
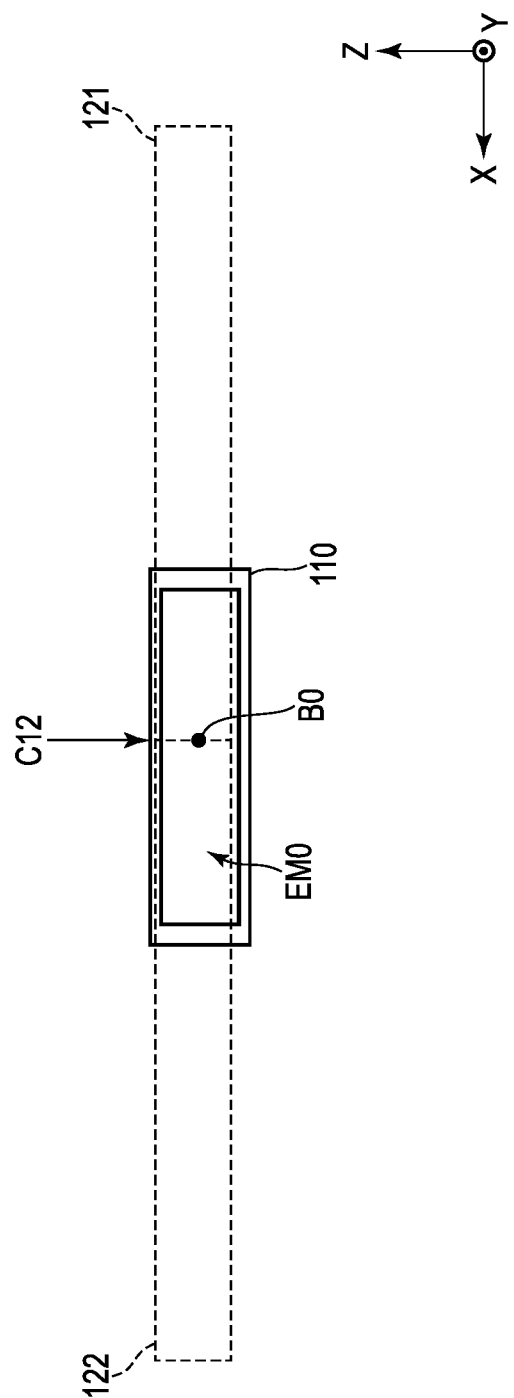
FIG. 12 is a front view showing a fourth configuration example of the light source 110.

FIG. 12 is a front view showing a fourth configuration example of the light source 110. In FIG. 12, the light guides 121 and 122 are indicated by dotted lines. The fourth configuration example shown in FIG. 12 is different from the third configuration example shown in FIG. 11 in that the light source 110 has only the blue light-emitting point B0 as a light-emitting point. Focusing on the positional relationship between the light source 110 and the contact portion C12, the contact portion C12 overlaps the blue light-emitting point B0 in the second direction Y. In other words, the contact portion C12 is located directly in front of the blue light-emitting point B0.

Even in this fourth configuration example, the same effect as in the third configuration example can be obtained.

Figure 13:
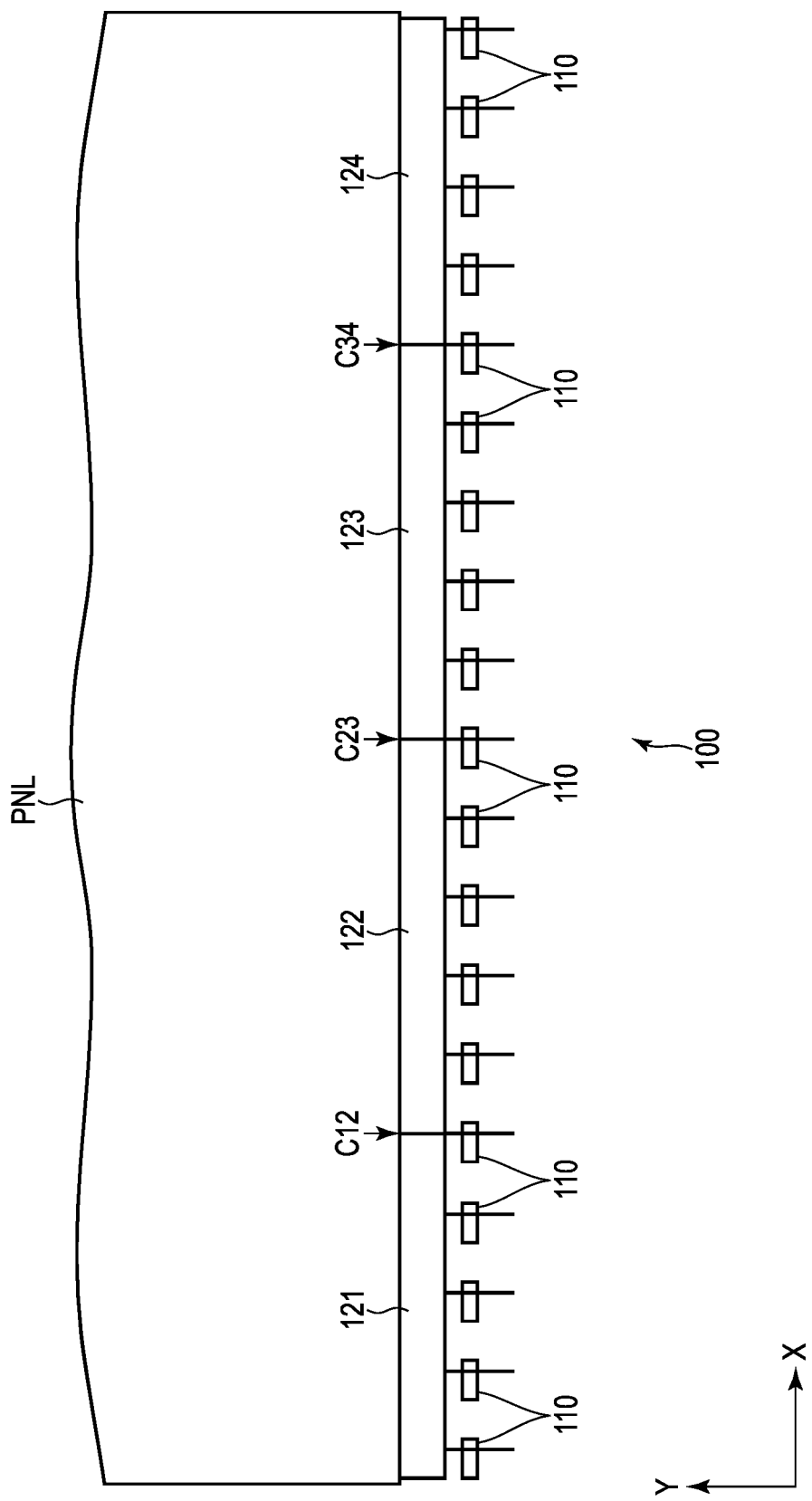
FIG. 13 is a plane view showing an example of the relationship between pitches of the light sources and lengths of the light guides.

FIG. 13 is a plane view showing an example of the relationship between pitches of the light sources and lengths of the light guides. As described above, the contact portion C12 between the light guide 121 and the light guide 122 overlaps the light-emitting point of the light source 110 in the second direction Y. Similarly, the contact portion C23 and the contact portion C34 overlap the respective light-emitting points of the light sources 110 in the second direction Y. In order to realize such relationship, light guides having different lengths may be applied as described with reference to FIG. 8, or light sources arranged at different pitches may be applied as described with reference to FIG. 9.

Figure 14:
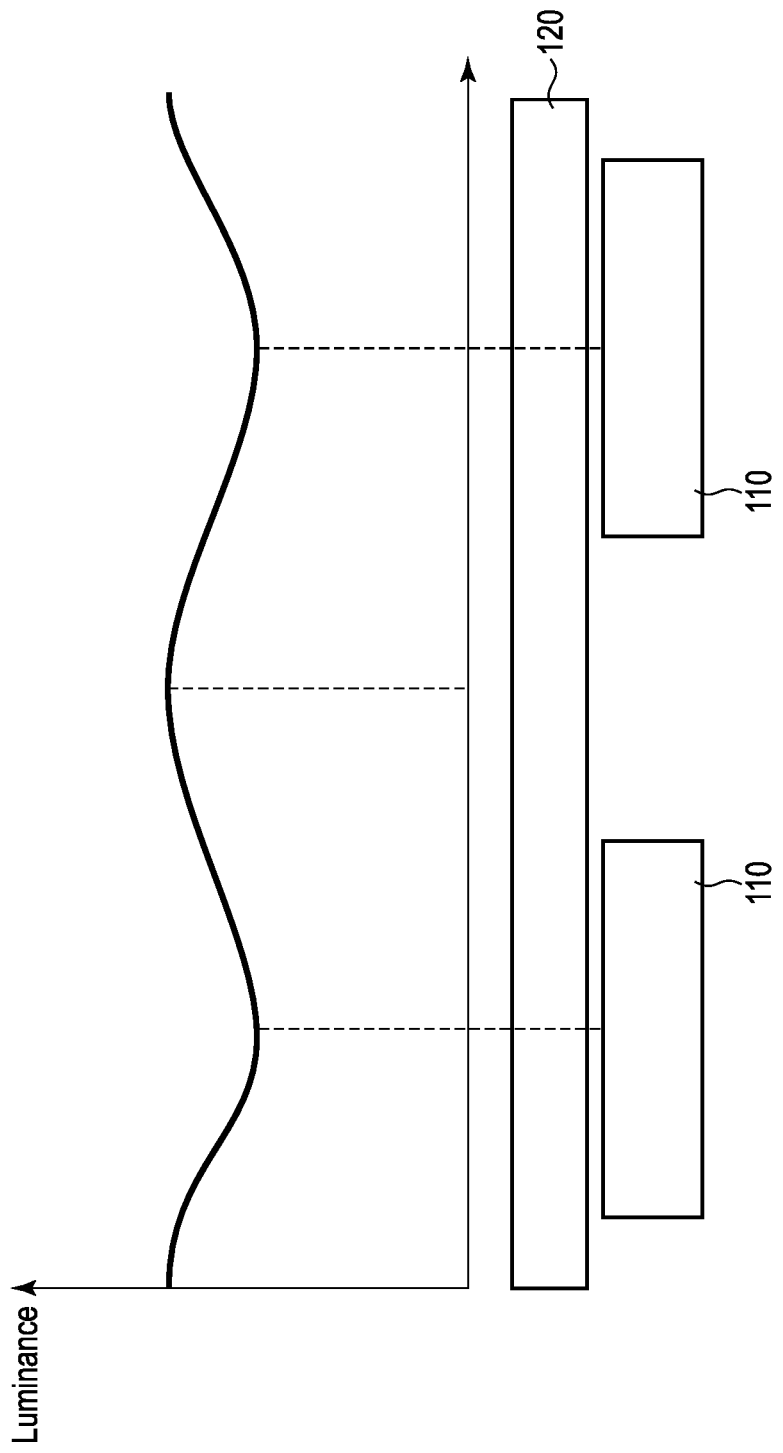
FIG. 14 is a view schematically showing diffusion characteristics of a light guide 120 applicable in the present embodiment.

FIG. 14 is a view schematically showing diffusion characteristics of the light guide 120 applicable in the present embodiment. The light guide 120 shown in FIG. 14 has diffusion characteristics in which the luminance of the portion between the light sources 110 adjacent to each other is higher than the luminance of the portion overlapping each light source 110. In other words, the light guide 120 has high diffusion capability in the X-Y plane. When such light guide 120 is applied to the light-emitting module 100 of the present embodiment, the contact portions are desirably located equidistant from adjacent light-emitting points as in the above-mentioned first and second configuration examples.

Figure 15:
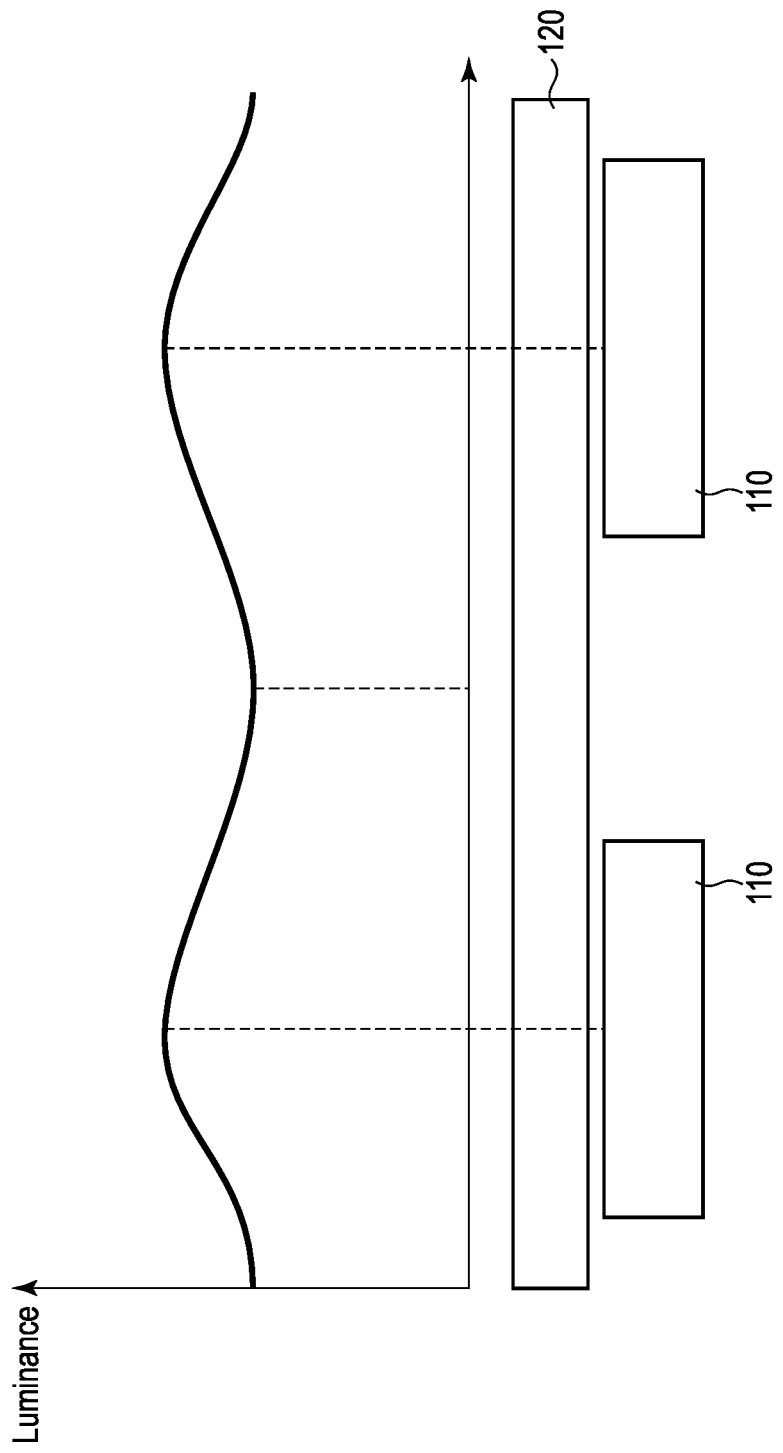
FIG. 15 is a view schematically showing diffusion characteristics of another light guide 120 applicable in the present embodiment.

FIG. 15 is a view schematically showing diffusion characteristics of another light guide 120 applicable in the present embodiment. The light guide 120 shown in FIG. 15 has diffusion characteristics in which the luminance of the portion overlapping each light source 110 is higher than the luminance of the portion between the light sources 110 adjacent to each other. In other words, the diffusion capability of the light guide 120 shown in FIG. 15 is lower than the diffusion capability of the light guide 120 shown in FIG. 14. When such light guide 120 is applied to the light-emitting module 100 of the present embodiment, the contact portions desirably overlap the light-emitting points as in the above-mentioned third and fourth configuration examples.

Next, an application example of the light-emitting module 100 will be described.

Figure 16:
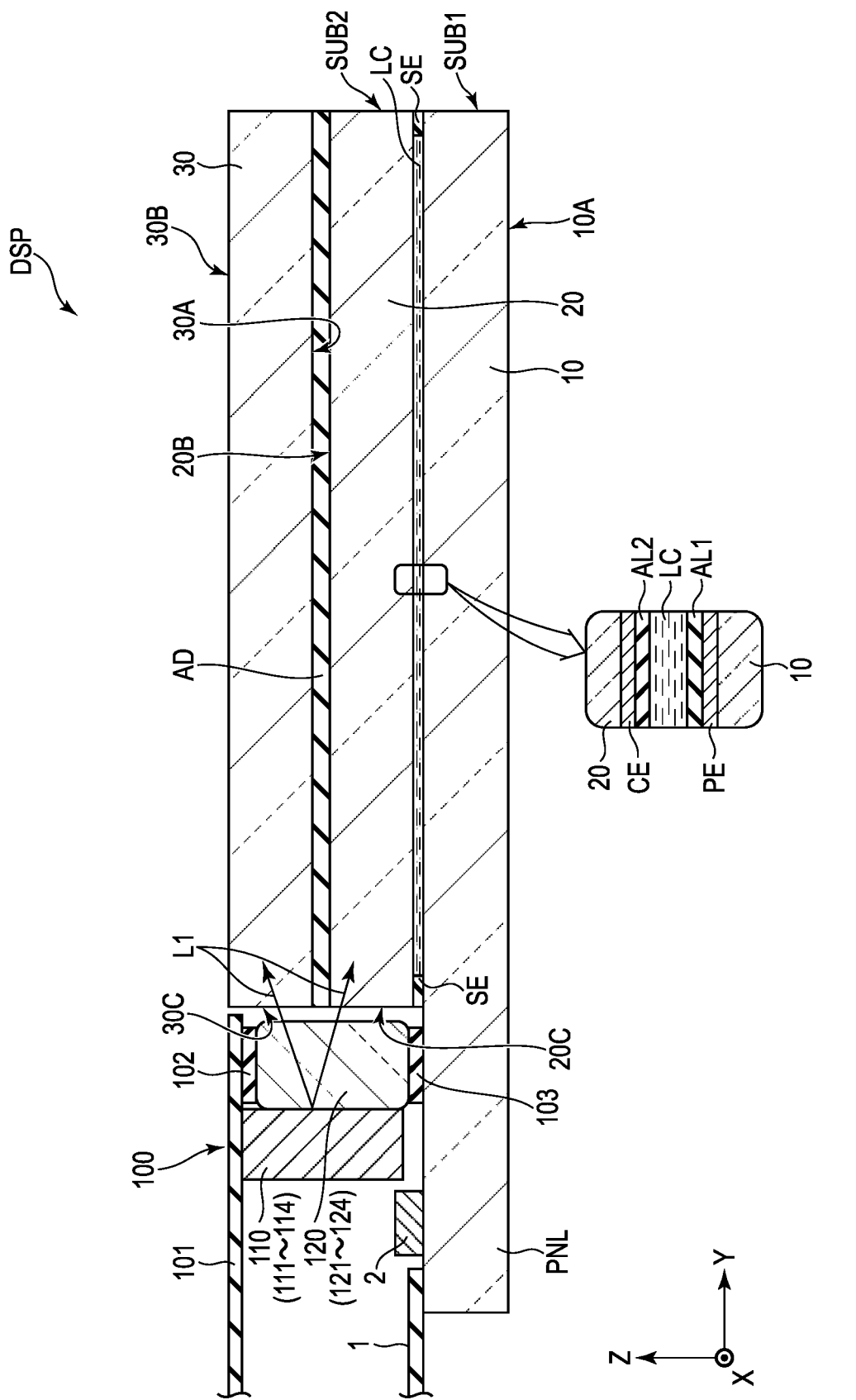
FIG. 16 is a cross-sectional view of the display device DSP including the light-emitting module 100.

FIG. 16 is a cross-sectional view of the display device DSP including the light-emitting module 100. Incidentally, only the main part of the display panel PNL is shown in a simplified manner.

The display panel PNL further includes a transparent substrate 30. The transparent substrate 30 includes a main surface (inner surface) 30A and a main surface (outer surface) 30B opposite to the main surface 30A. The main surface 30A faces the main surface 20B. An adhesive layer AD bonds the transparent substrate 20 to the transparent substrate 30. The transparent substrate 30 is, for example, a glass substrate, but may be an insulating substrate such as a plastic substrate. The transparent substrate 30 has the same refractive index as the transparent substrates 10 and 20. The adhesive layer AD has the same refractive index as the transparent substrates 20 and 30. Incidentally, "same" here is not limited to a case where the refractive index difference is 0, and includes a case where the refractive index difference is 0.03 or less.

The transparent substrate 20 has a side surface 20C, and the transparent substrate 30 has a side surface 30C. The side surface E21 of the display panel PNL shown in FIG. 1 and the like includes the side surfaces 20C and 30C. The side surface 30C is located directly above the side surface 20C.

In the light-emitting module 100, the light source 110 is provided between the first substrate SUB1 and the wiring substrate 101 in third direction Z. The light guide 120 is provided between the light source 110 and the side surface 20C and between the light source 110 and the side surface 30C in the second direction Y. The light guide 120 is bonded to the wiring substrate 101 with the adhesive layer 102, and is bonded to the first substrate SUB1 with the adhesive layer 103.

Next, light L1 emitted from the light source 110 will be described with reference to FIG. 16.

The light source 110 emits light L1 toward the light guide 120. The light L1 emitted from the light source 110 propagates along an arrow direction indicating the second direction Y, passes through the light guide 120, is incident on the transparent substrate 20 from the side surface 20C, and is incident on the transparent substrate 30 from the side surface 30C. The light L1 incident on the transparent substrates 20 and 30 propagates inside the display panel PNL while being repeatedly reflected. The light L1 incident on the liquid crystal layer LC to which no voltage is applied is transmitted through the liquid crystal layer LC with little scattering. In addition, the light L1 incident on the liquid crystal layer LC to which a voltage is applied is scattered by the liquid crystal layer LC. The display device DSP can be observed from the main surface 10A side and can also be observed from the main surface 30B side. In addition, even when the display device DSP is observed from the main surface 10A side or the main surface 30B side, the background of the display device DSP can be observed through the display device DSP.

As described above, according to the present embodiment, it is possible to provide a display device capable of suppressing degradation in display quality.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
   a display panel comprising a polymer dispersed liquid crystal layer; and
   a light-emitting module provided along a side surface of the display panel,
   wherein the light-emitting module comprises:
   a first light source having a first light-emitting point;
   a second light source having a second light-emitting point of a same color as the first light-emitting point;
   a first light guide provided between the first light source and the side surface; and
   a second light guide provided between the second light source and the side surface, the second light guide forming a contact portion in contact with the first light guide,
   the first light guide and the second light guide are arranged in a first direction, and
   a distance between the contact portion and the first light-emitting point along the first direction is equal to a distance between the contact portion and the second light-emitting point along the first direction.

2. The display device according to claim 1, wherein colors of the first light-emitting point and the second light-emitting point are green.

3. The display device according to claim 1, wherein colors of the first light-emitting point and the second light-emitting point are blue.

4. The display device according to claim 1, wherein the light-emitting module comprises a plurality of the first light sources arranged in the first direction and a plurality of the second light sources arranged in the first direction,
   the first light guide faces the plurality of the first light sources,
   the second light guide faces the plurality of the second light sources, and
   a length of the first light guide along the first direction is different from a length of the second light guide along the first direction.

5. The display device according to claim 4, wherein a pitch of the first light source is equal to a pitch of the second light source.

6. The display device according to claim 1, wherein the light-emitting module comprises a plurality of the first light sources arranged in the first direction and a plurality of the second light sources arranged in the first direction, and
   a pitch of the first light source is different from a pitch of the second light source.

7. The display device according to claim 6, wherein the first light guide faces the plurality of the first light sources,
   the second light guide faces the plurality of the second light sources, and
   a length of the first light guide along the first direction is equal to a length of the second light guide along the first direction.

8. The display device according to claim 1, wherein the light-emitting module further comprises a wiring substrate electrically connected to the first light source; and an adhesive layer that adheres the wiring substrate and the first light guide and adheres the wiring substrate and the second light guide.

9. A display device comprising:
   a display panel comprising a polymer dispersed liquid crystal layer; and
   a light-emitting module provided along a side surface of the display panel,
   wherein the light-emitting module comprises:
   a first light source having a first red light-emitting point, a first green light-emitting point, and a first blue light-emitting point;
   a second light source having a second red light-emitting point, a second green light-emitting point, and a second blue light-emitting point;
   a first light guide provided between the first light source and the side surface; and
   a second light guide provided between the second light source and the side surface, the second light guide forming a contact portion in contact with the first light guide,
   the first light guide and the second light guide are arranged in a first direction, and
   a center between the first green light-emitting point and the second green light-emitting point is nearer to the contact portion than a center between the first red light-emitting point and the second red light-emitting point and a center between the first blue light-emitting point and the second blue light-emitting point.

10. The display device according to claim 9, wherein the light-emitting module comprises a plurality of the first light sources arranged in the first direction and a plurality of the second light sources arranged in the first direction,
    the first light guide faces the plurality of the first light sources,
    the second light guide faces the plurality of the second light sources, and a length of the first light guide along the first direction is different from a length of the second light guide along the first direction.

11. The display device according to claim 10, wherein a pitch of the first light source is equal to a pitch of the second light source.

12. The display device according to claim 9, wherein the light-emitting module comprises a plurality of the first light sources arranged in the first direction and a plurality of the second light sources arranged in the first direction, and
a pitch of the first light source is different from a pitch of the second light source.

13. The display device according to claim 12, wherein the first light guide faces the plurality of the first light sources,
the second light guide faces the plurality of the second light sources, and
a length of the first light guide along the first direction is equal to a length of the second light guide along the first direction.

14. A display device comprising:
a display panel comprising a polymer dispersed liquid crystal layer; and
a light-emitting module provided along a side surface of the display panel,
wherein the light-emitting module comprises:
a first light source having a light-emitting point;
a first light guide provided between the first light source and the side surface; and
a second light guide provided between the first light source and the side surface, the second light guide forming a contact portion in contact with the first light guide,
the first light guide and the second light guide are arranged in a first direction, and
the contact portion overlaps the light-emitting point in a second direction intersecting the first direction.

15. The display device according to claim 14, wherein a color of the light-emitting point is green.

16. The display device according to claim 14, wherein a color of the light-emitting point is blue.

17. The display device according to claim 14, wherein the light-emitting module further comprises a wiring substrate electrically connected to the first light source; and an adhesive layer that adheres the wiring substrate and the first light guide and adheres the wiring substrate and the second light guide.

\* \* \* \* \*